Jan. 27, 1931.  P. J. SAVAGE  1,790,327
AUTOMOTIVE DRIVING VISOR
Filed Aug. 22, 1929
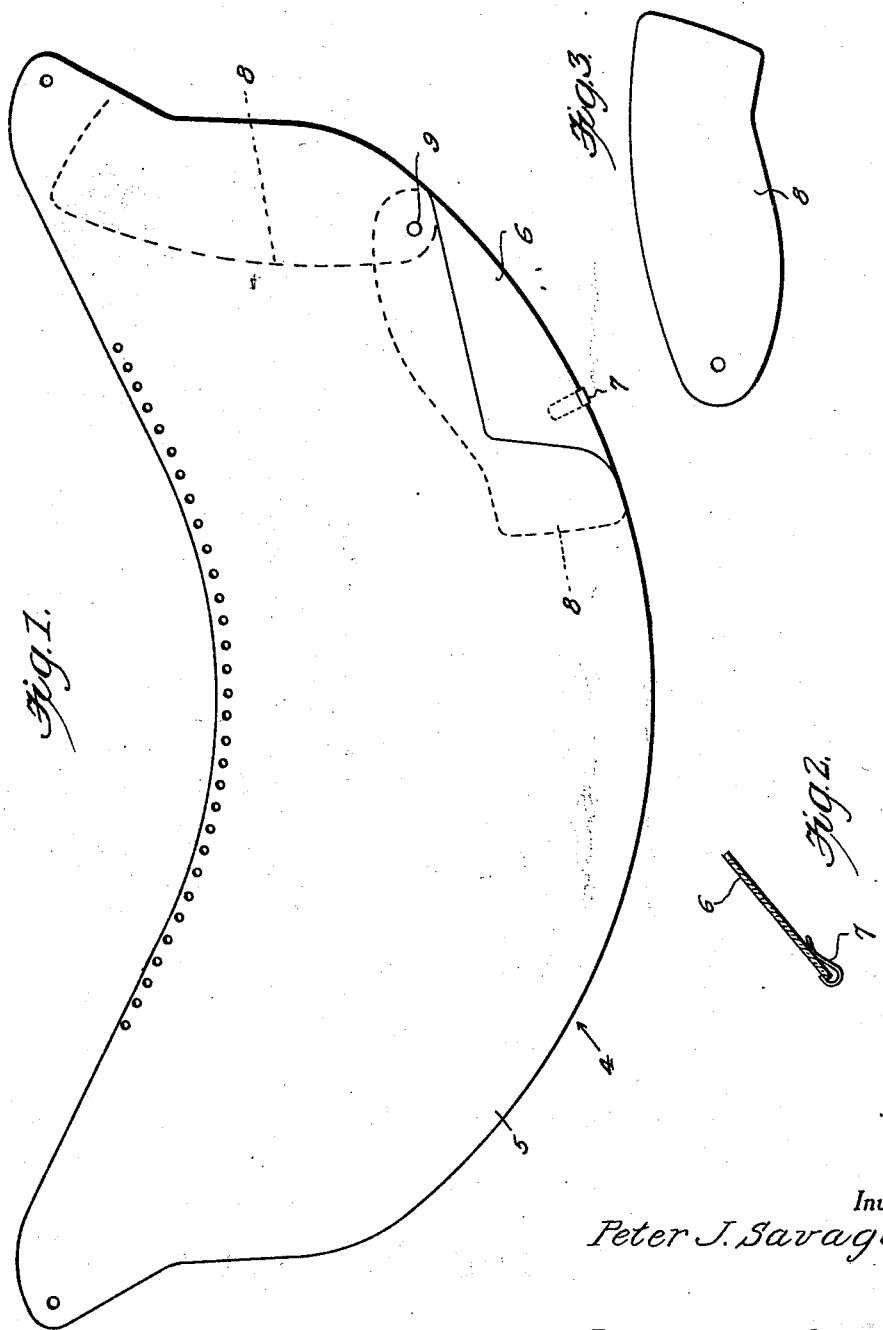
Inventor
Peter J. Savage,
By Clarence A. O'Brien
Attorney Patented Jan. 27, 1931

1,790,327

UNITED STATES PATENT OFFICE

PETER J. SAVAGE, OF IRON RIVER, WISCONSIN

AUTOMOTIVE DRIVING VISOR

Application filed August 22, 1929. Serial No. 387,696.

The invention relates to an improved automotive appliance for personal use by automobile operators and it is hereinafter generally referred to as a driving visor which is especially, but not necessarily, intended for night driving.

The improved night driving visor is intended to meet the needs for a cheap and practical way of protecting people driving and riding in motor vehicles from being blinded by the glare from the lights of passing motor vehicles, and at the same time permit the party wearing the visor to see that part of the highway necessary to be seen in order to safely control the car in which he is driving, thus reducing to a minimum the danger of head-on collisions or driving off the highway.

It is also intended to be a comfort to all people riding in automobiles and other motor vehicles at night, for with the use of this visor they may see at all times the position of their own car on the highway, and thus avoid the nervous strain which naturally attends when they themselves are blinded by the lights of approaching vehicles, and are fearful that their driver is similarly affected.

Stated otherwise, the device is an eye shade worn over the eyes in a manner similar to visors of that nature commonly in use. It may be made of celluloid, mica, glass or other transparent, or partially transparent materials, and fastened to the head as such visors are now fastened thereto when in use, namely, by strings, or bands of elastic or otherwise, passing around the head, or over the head, attached as a rim to a hat or cap, or otherwise attached to the head so that the person wearing it may control the position of the visor by the movement of his head.

In carrying the invention into effect I have evolved and produced a simple, inexpensive and otherwise economical appliance which may be conveniently worn by the user and which is especially constructed to fulfill the requirements of an appliance of this class in a highly satisfactory and efficient manner.

In the drawings:

Figure 1 is a top plan view of the visor as constructed in accordance with the present invention showing the manner in which the shutter is moved from ineffective to effective positions.

Figure 2 is a fragmentary sectional view showing a retaining clip for the shutter.

Figure 3 is a top plan view of the shutter per se.

In carrying out the invention, I have found it convenient to provide a visor 4 of the general configuration designated in Figure 1 and this is intended to be strapped or otherwise fastened upon the head of the wearer. That portion of the visor designated by the reference character 5 is made of a substance, for instance, colored celluloid, which when held between the eyes and the glaring light of a motor vehicle will so shade the lights as to cause no discomfort or injury, temporary or otherwise, to the eyes.

This portion of the visor is of a somewhat opaque nature. A limited sector, indicated at 6, is made of colorless celluloid, mica, glass or other material, or this may merely be an opening with no substance there whatever. This portion 6 permits the maximum of clear vision through it, so that the person wearing the visor, by merely dropping his head slightly may bring the dark portion of the visor between the eyes and the light, but permitting the one eye to have an unobstructed view of all of the highway to the right of the approaching car for a distance of one hundred yards or more, as well as that part of the highway which appears below the surface of that portion marked 5.

On this portion 6 is a retaining clip 7 for a part 8 which may be conveniently referred to as a shutter. This shutter is of the configuration seen in Figure 3 and is pivotally mounted on the body portion as at 9 and is intended to occupy either of the dotted line positions shown in Fig. 1. When at the right (Fig. 1) it is in the out-of-the-way position to permit unobstructed vision through the portion 6. When in the position at the left it covers the portion 6, as is obvious.

In the latter position it is maintained by the clip 7. This clip 7 may be bodily detached and shifted for holding the shutter either in the closing position shown at the left in Figure 1 or in the open position shown at the right in dotted lines in Fig. 1. As before indicated, it is obvious that by merely dropping his head, the wearer may bring the dark portion 5 of the visor between his eyes and the light of the approaching vehicle, at the same time permitting one eye to have an unobstructed vision of the highway either through the notch or area 6 whichever is employed in the construction of the device. The lights of the approaching car being constantly observed by the driver through the heavily colored portion 5, the operator may then slightly move his head sideways as the motor vehicles change positions, so that when the approaching car reaches a point approximately seventy-five feet away, the operator can see his entire half of the highway and even more without exposing his eyes to the glare of the lights of the approaching car. In other words, at the time the driver needs a full view of the highway in front of him he has it, unobstructed by any colored substance which might otherwise impair his vision.

The shutter may be adjusted at will to facilitate either day or night driving, as desired.

From the foregoing description and drawings it will be seen that I have evolved and produced a simple and economical automotive appliance which is a distinct advance in the art and susceptible of fulfilling the requirements of an invention of this class and which is characterized by the following distinct advantages.

First: It is the only invention which applies the principle of control of light and shadows upon a highway and roadbed which has been applied to a very popular article in general use, and without in any way impairing that article for the uses heretofore put and which gained for it its popularity.

Second: The one eye clear vision plan is the only practical plan as applied to a visor. This is the only invention permitting sight through one eye through a clear portion and which at the same time permits him to also see all lights in the shaded portion and enables him to see all such lights in shaded portion in their true shades and colors.

Third: It is easier to adjust to the pupil of the eye than any two vision visor would be, if such a one were made.

Fourth: It is the only invention embracing its features and which will perform its useful functions which can be fitted to the eye by the wearer himself and which can be manufactured in quantities and carried in stock by dealers.

Fifth: It is the only invention which has features which insure the invention's general use, independent of the night driving feature. Therefore, people will have a night driving feature that they naturally will learn to use, and which is entirely practical.

Sixth: One visor is all that any party of automobilists needs for driving, and one member of the party can change off with the other, and all can use the same visor, getting one hundred per cent efficiency therefrom.

Seventh: It is the only night driving visor in existence, as far as I am able to know, and there is no other invention, as far as I know, which will give the wearer as much and satisfactory protection from annoying and dangerous lights, it matters not from what direction they may come, or whether they are shining upon the driver from various directions at the same time.

Eighth: Because of the ease of adjustment to any person; because of its great and varied practical utility either for day or night; because of its attractiveness as a part of head dress, because no such prejudice exists against the visor as exists against the use of goggles or wire contraptions before the eyes; because they bring comfort instead of discomfiture as a light, restful, cool eye shade; because these novel and attractive features will prove so popular as to bring my visor into general use.

Attention is invited to the fact that in the illustration shown in the drawings, the clear vision area or sector 6 is at the right, that is, over the right eye of the driver. I wish to make it plain however, that in certain districts it is desirable to reverse this feature and to have it on the left side. It is understood however, that this is within the scope of the invention.

Minor changes in shape, size and materials used, and rearrangement of details coming within the field of invention claimed may be resorted to in actual practice if desired.

I claim:

A visor comprising a substantially crescent shaped portion of translucent material having a restricted transparent sector adjacent its forward end to one side of the transverse center of the body so as to be in the line of vision of one eye of the wearer, an elongated shutter of translucent material pivotally mounted on the body portion adjacent the outer end of the transparent sector and adapted to be moved to a closing position adjacent the forward edge of the visor to cover the said transparent sector and also to be moved to an out of the way position adjacent a lateral edge of the visor, said shutter having its opposite longitudinal edges conforming to the curvatures of the said forward and lateral edges of said body portion, and a detachable clip engaged with the edge of the said body portion and capable of being bodily shifted along the said edge for holding the said shutter in either its closing or out of the way position.

In testimony whereof I affix my signature.

PETER J. SAVAGE.